United States Patent
Griess et al.

(10) Patent No.: US 9,527,572 B2
(45) Date of Patent: Dec. 27, 2016

(54) ELONGATED STRUCTURES AND RELATED ASSEMBLIES

(71) Applicant: The Boeing Company, Chicago, IL (US)

(72) Inventors: Kenneth H. Griess, Kent, WA (US); Karen D. MacKenzie, Bothell, WA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 14/316,531

(22) Filed: Jun. 26, 2014

(65) Prior Publication Data
US 2015/0375843 A1    Dec. 31, 2015

(51) Int. Cl.
*B64C 1/06* (2006.01)
*B64C 3/18* (2006.01)

(52) U.S. Cl.
CPC .................. *B64C 1/064* (2013.01); *B64C 1/06* (2013.01); *B64C 3/18* (2013.01); *B64C 3/182* (2013.01)

(58) Field of Classification Search
CPC ............ B64C 1/06; B64C 1/061; B64C 1/064; B64C 1/068; B64C 1/12; B64C 3/182; E04C 3/07; E04C 2003/0452; E04C 2003/046; E04C 2003/0404; E04C 2003/0413; E04C 2003/0421; E04C 2003/0443
USPC .......... 52/831, 836, 837, 838, 846; 244/119, 244/120, 118.1
See application file for complete search history.

(56) References Cited

U.S. PATENT DOCUMENTS

| | | | | |
|---|---|---|---|---|
| 999,752 A | * | 8/1911 | Connell | E04B 2/723 52/241 |
| 2,617,179 A | * | 11/1952 | Burke | 29/897.35 |
| 5,148,642 A | * | 9/1992 | Plumier et al. | 52/167.1 |
| 5,352,078 A | | 10/1994 | Nasu | |
| 5,477,596 A | | 12/1995 | Schlosstein et al. | |
| 5,518,208 A | * | 5/1996 | Roseburg | B64C 1/064 244/119 |
| 5,595,040 A | * | 1/1997 | Chen | 52/837 |

(Continued)

FOREIGN PATENT DOCUMENTS

| | | |
|---|---|---|
| EP | 2179920 A2 | 4/2010 |
| WO | 2009065587 A1 | 5/2009 |

OTHER PUBLICATIONS

Extended European Search Report issued in European Patent Application No. 15174041.2 dated Nov. 13, 2015.

*Primary Examiner* — Joshua J Michener
*Assistant Examiner* — Theodore Adamos
(74) *Attorney, Agent, or Firm* — McDonnell Boehnen Hulbert & Berghoff LLP

(57) ABSTRACT

An elongated structure comprising a web extending along a length of the elongated structure and a flange comprising a first flange portion, the first flange portion extending away from an area of the web. The first flange portion comprises a variable width along at least a portion of the length of the elongated structure. The first flange portion of the elongated structure may comprise the variable width the length of the elongate structure. The first flange portion may comprise a constant width along at least a portion of the length of the elongated structure. The elongated structure may further comprise a second flange portion. The second flange portion may comprise a variable width along at least a portion of the length of the elongate structure. The first flange portion may comprise a first top flange portion.

24 Claims, 5 Drawing Sheets

(56) References Cited

U.S. PATENT DOCUMENTS

| | | | |
|---|---|---|---|
| 5,797,573 A | 8/1998 | Nasu | |
| 6,141,848 A | 11/2000 | Yousko et al. | |
| 6,520,706 B1* | 2/2003 | McKague et al. | 403/265 |
| 6,648,273 B2 | 11/2003 | Anast | |
| 7,080,805 B2* | 7/2006 | Prichard et al. | 244/117 R |
| 7,159,822 B2* | 1/2007 | Grantham | B64C 1/12 244/119 |
| 7,434,366 B2 | 10/2008 | Zahner, III | |
| 7,735,780 B2 | 6/2010 | Coles | |
| 8,011,160 B2* | 9/2011 | Rice | E04B 2/7457 248/247 |
| 8,038,099 B2 | 10/2011 | Anast et al. | |
| 8,209,939 B2* | 7/2012 | Anast et al. | 52/838 |
| 8,336,820 B2* | 12/2012 | Osorio et al. | 244/118.1 |
| 8,353,479 B2* | 1/2013 | Tacke et al. | 244/119 |
| 8,424,806 B2 | 4/2013 | Outon Hernandez et al. | |
| 8,453,975 B2 | 6/2013 | Dietrich et al. | |
| 8,534,605 B2* | 9/2013 | Haack | 244/120 |
| 8,622,347 B2 | 1/2014 | Oyzerskiy | |
| 2003/0080251 A1* | 5/2003 | Anast | 244/119 |
| 2004/0089699 A1* | 5/2004 | Simmons | 228/165 |
| 2005/0263645 A1* | 12/2005 | Johnson et al. | 244/119 |
| 2006/0108057 A1 | 5/2006 | Pham et al. | |
| 2006/0243860 A1 | 11/2006 | Kismarton | |
| 2007/0022707 A1* | 2/2007 | Gregg et al. | 52/735.1 |
| 2007/0151375 A1 | 7/2007 | Kennedy et al. | |
| 2008/0072527 A1* | 3/2008 | Kondo | B29C 66/5244 52/841 |
| 2008/0128549 A1 | 6/2008 | Engwall et al. | |
| 2008/0257490 A1 | 10/2008 | Jones et al. | |
| 2008/0302912 A1 | 12/2008 | Yip et al. | |
| 2008/0302915 A1 | 12/2008 | Yip et al. | |
| 2010/0054877 A1 | 3/2010 | Buttrick, Jr. et al. | |
| 2010/0243804 A1* | 9/2010 | Vera Villares et al. | 244/119 |
| 2010/0304094 A1 | 12/2010 | Brook et al. | |
| 2011/0089291 A1* | 4/2011 | Dietrich et al. | 244/120 |
| 2011/0111183 A1 | 5/2011 | Guzman et al. | |
| 2011/0139932 A1 | 6/2011 | Matheson et al. | |
| 2011/0284693 A1 | 11/2011 | Barnard et al. | |
| 2012/0045609 A1 | 2/2012 | Brook et al. | |
| 2012/0114439 A1 | 5/2012 | Buttrick et al. | |
| 2012/0153082 A1* | 6/2012 | Rosman | B64C 1/068 244/120 |
| 2012/0292446 A1 | 11/2012 | Kamaraj et al. | |
| 2014/0075738 A1 | 3/2014 | Oyzerskiy | |
| 2015/0096244 A1* | 4/2015 | Richards | E04C 3/40 52/167.1 |

* cited by examiner

ELONGATED STRUCTURES AND RELATED ASSEMBLIES

FIELD

The present disclosure relates generally to elongated structures. More particularly, the present disclosure relates to aircraft structures, such as stringers and other related assemblies.

BACKGROUND

Elongated structures for use with vehicles, such as airplanes, are available in a wide variety of configurations to provide structural support under a variety of loading conditions. In particular, the wing and fuselage surfaces of an aircraft typically include parallel and span-wise oriented structural members called stringers. Such stringers are typically operably coupled to skin members on the wing and fuselage surfaces that cooperatively provide the desired flexural and torsional stiffness to the wing and fuselage surfaces. Such wing and fuselage surfaces may be fabricated from a metal materials, such as aluminum, steel or titanium or non-metal materials. The stringer may include a planar web portion that is generally oriented in a direction approximately perpendicular to the skin member and extending in a span wise direction along the wing or fuselage surface so that the web portion offers resistance to a bending moment generated by the load.

A flange portion may be positioned on one or both of the longitudinal edges of the web portion in order to provide resistance to localized failure of the web portion due to lateral buckling. The flange portion further allows the stringer to be coupled to the skin member and/or frame members by providing an attachment surface for the skin member. The stringer also may help carry and/or transfer loads. For example, a stringer may transfer a load from a skin panel to another structure. This other structure may be, for example, a frame or rib.

Although such elongated structures can offer certain superior bending stiffness properties over other design configurations, one issue that may tend to limit the usage of certain elongated structures is the difficulty of attaching the elongated structure to adjacent structures with adequate load transfer at the attachment region without undue increase in weight and cost. For example, typically attachment fittings must be machined in order to facilitate the proper attachment of certain elongated structures to various types of related structures, such as wing or fuselage frame members. While in certain situations it can be relatively easy to attach certain elongated structures when the applied loads are low, it is quite a challenge to do so for highly loaded structure.

Designing stringers with a desired weight and performance characteristics may also be challenging. For example, a stringer with desired performance characteristics may be more structural and geometrically complex or may weigh more than desired. With increased structural and geometrical complexity, time and cost for manufacturing a stringer also may increase. If the stringer has a desired weight, performance characteristics may be such that additional stringers may be required where a single stringer is desired. Therefore, it would be advantageous to have a method and apparatus that takes into account at least some of the issues discussed above, as well as possibly other issues.

Although desirable results have been achieved using prior art apparatus and methods, a stringer and skin structure that may be more easily and inexpensively fabricated, and that may provide a more favorable strength to weight ratio in comparison to certain known stringer and skin structures, would have utility.

There is, therefore, a need for a more cost effective and less labor intensive method of assembling elongated structures and their related assemblies. It would also be desirable to reduce or eliminate the need for the total number of stringers for certain aircraft assemblies (i.e., the fuselage and wings) in order to reduce the overall weight and assembly time. It would also be desirable to reduce the number of stingers required to attach the skin to the stringers and the frame. It would also be desirable to be able to tailor or vary an elongated structure's geometry so as to be able to adequately withstand different types or varying types of loads that the elongated structure will undergo along the length of the elongated structure, so as to minimize the amount of structure material and therefore weight of the elongated structure. Such a desired cost effective and less labor intensive assembled structures should also offer a more efficient method of providing a more robust attachment of stringers to frame members while also increasing manufacturing facility throughput while also driving down overall system manufacturing costs.

SUMMARY

According to an exemplary arrangement, a method and system for forming an elongated structure is presented. For example, in one arrangement, an elongated structure comprises a web extending along a length of the elongated structure and a flange comprising a first flange portion. The first flange portion extends away from an area of the web. The first flange portion comprising a variable width along at least a portion of the length of the elongated structure. The first flange portion of the elongated structure may comprise a variable width along the length of the elongate structure. The first flange portion of the elongated structure may comprise a constant width along at least a portion of the length of the elongated structure.

In one arrangement, the elongated structure may further comprise a second flange portion in addition to the first flange portion. The second flange portion may comprise a variable width along at least a portion of the length of the elongate structure. In addition, the second flange portion may comprise a constant width along at least a portion of the length of the elongated structure.

The first flange portion may comprise a planar surface, a rounded portion, a sharp portion, and/or a concave portion. The first flange portion may comprise a shape selected from any of the following shapes including convex, fin-shaped, saw tooth, rectangular, stepped and/or ramped shapes.

A structural assembly is disclosed comprising a first elongated structure comprising a web, a first flange extending along at least a portion of the web, the first flange comprising a variable width. A second elongated structure comprising approximately a perpendicular orientation to the first elongated structure and comprising an opening that is complementary in shape to the first elongated structure.

A method for supporting a structural load in a vehicle is disclosed. This method comprises the steps of loading a first load onto an elongated structure, the first load being received in a flange of the elongated structure, the flange comprising a variable width along at least a portion of the elongated structure, and unloading the first load on the elongated structure. This first load may be provided when the vehicle is airborne. This first load may be unloaded when the vehicle is not airborne. In addition, the first load may vary along a length of the flange. This flange width may vary with load along a length of the flange.

The features, functions, and advantages can be achieved independently in various arrangements of the present disclosure or may be combined in yet other arrangements in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings, wherein:

FIG. 5b illustrates a close up view of the elongated structure and frame illustrated in FIG. 5a;

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

The present disclosure provides for embodiments of an elongated structure having at least one variable width flange. Such a flange may comprise at least one edge that extends away from an elongated structure web. Such a flange may be used for strength, for guiding, and/or for attachment of the elongated structure to other structures, such as another elongated structure, a frame member, a skin assembly, or other similar type structures. Such elongated structures may be operably coupled to at least one frame, for example by an elongated structure mounting clip. Embodiments of the elongated structure and method may be used in aircraft, spacecraft, motor craft, watercraft, and other craft, as well vehicles and other similar structures. In addition, embodiments of the structure and method may be used with integrated commercial building materials for both cooling applications, as well as energy harvesting from lightweight structures.

Figure 1:
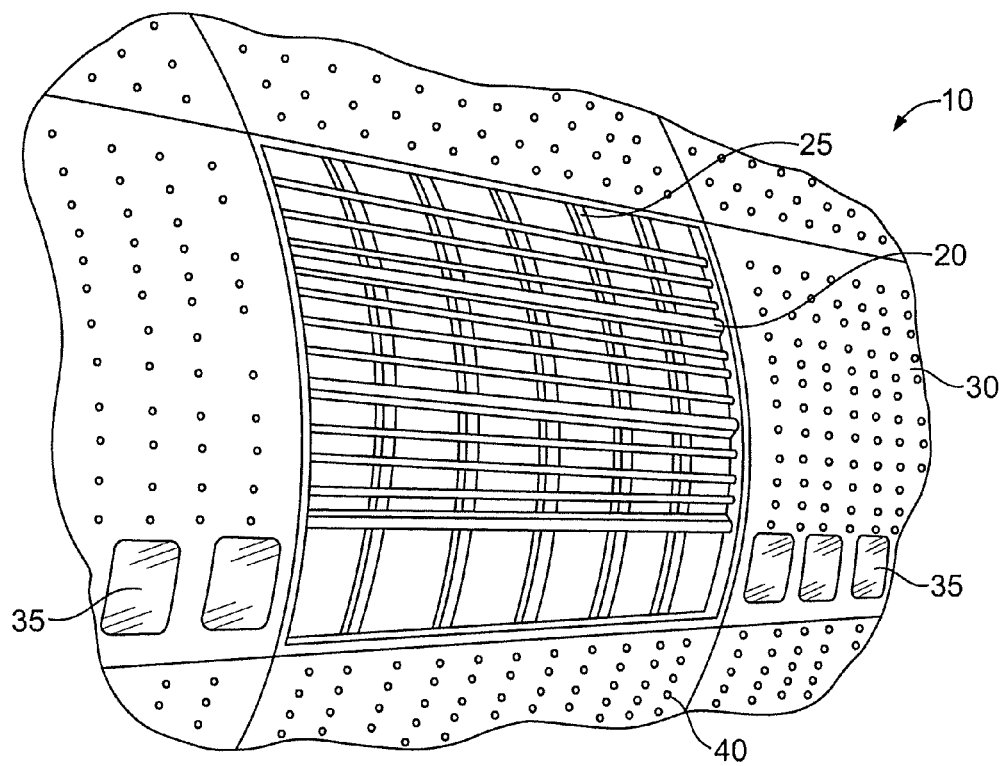
FIG. 1 illustrates a perspective view of a portion of an aircraft fuselage of one embodiment of the disclosure.
Figure 2:
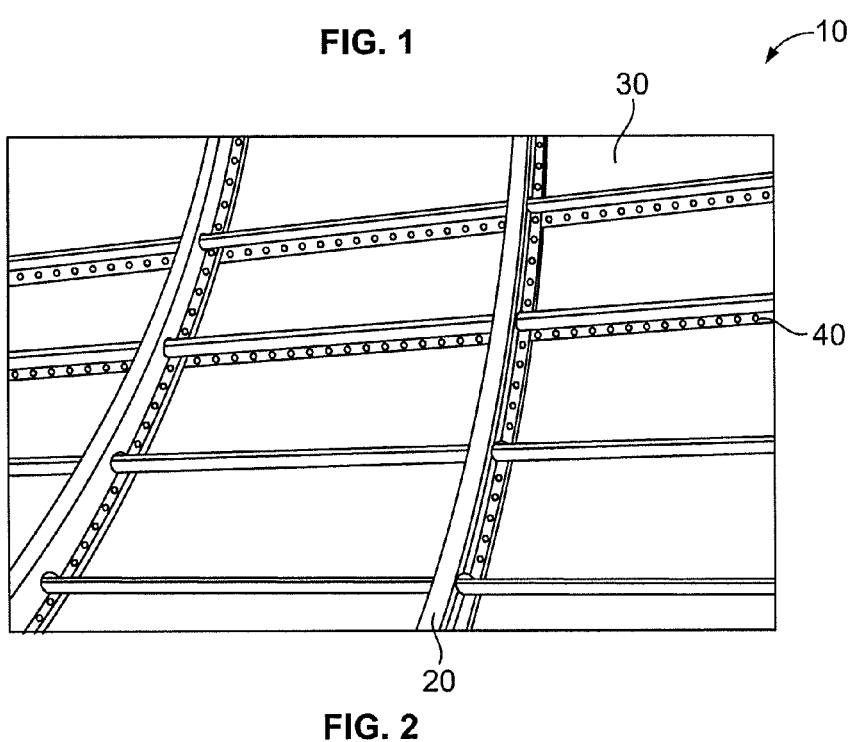
FIG. 2 illustrates a perspective view of the inside of the fuselage of FIG. 1 illustrating a plurality of elongated structures and frame members.

The present disclosure now will be described more fully hereinafter with reference to the accompanying drawings, in which preferred embodiments of the disclosure are shown. For example, an exemplary aircraft fuselage 10 of the present disclosure is illustrated in FIG. 1. FIG. 2 illustrates a perspective view of the inside of the fuselage of FIG. 1 illustrating a plurality of elongated structures and frame members. As illustrated, the aircraft fuselage 10 comprises a plurality of structural assemblies comprising elongated members (e.g., stiffeners, beams, stringers, spars, and ribs) that may be used to form a skeletal like structure (e.g., a framework). This skeletal like structure may be overlaid with a skin material, such as a composite material or alternatively metal. In this illustrated arrangement, this aircraft fuselage comprises a plurality of elongated structures 20 (e.g., stringers), a plurality of frame members 25, and a skin assembly 30 having a row of windows 35 housed therein.

The skin assembly 30 may be attached to the members 20, 25 via an array of fasteners 40 that operably couple the skin assembly and the members to one another. And as described in greater detail herein, the elongated structures 20 may be operably coupled to the frame members 25 by way of a mounting clip. The fuselage 10 of the illustrated embodiment may have a tapered, cylindrical shape frequently used in aircraft, but other shapes are also possible and are still considered to be within the scope of the present invention. It should also be noted that the present disclosure is applicable to fuselage structures for other craft, including other aerospace craft such as a rocket or a launch vehicle, where it is desirable to have a lightweight, strong structure.

The elongated structures 20 comprise an elongated member that extends generally parallel to the axis of the aircraft fuselage 10, as shown in FIGS. 1 and 2. The frame members 25 typically comprise annular hoops, extending circumferentially around, and spaced along, an axis of the fuselage.

Figure 3:
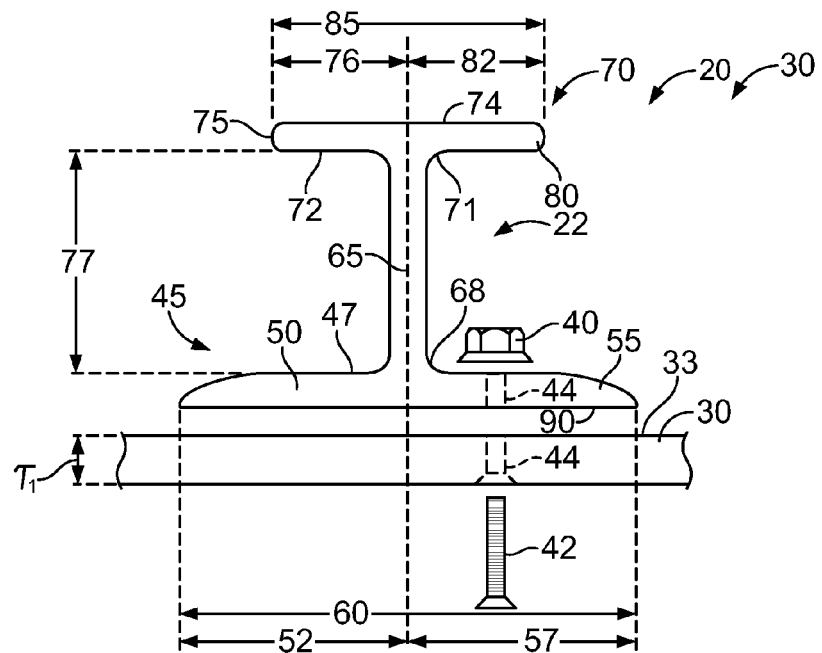
FIG. 3 illustrates an exploded, partial cross sectional view of one of the elongated structures illustrated in FIGS. 1 and 2.

FIG. 3 illustrates an exploded, partial cross sectional view of skin and elongated structure assembly, such as the elongated structure 20 illustrated in FIGS. 1 and 2. In this particular illustrated arrangement, the elongated structure comprises a stringer or beam structure. The stringer or beam structure comprises an "I" beam structure, however, as noted below, alternative stringer, beam, and/or hat type structures may also be used.

As illustrated, the elongated structure 20 of the elongated structural assembly comprises an elongated structure portion 22. This elongated structure portion 22 comprises a web 65 that is positioned between a base or lower flange 45 and an opposing top or upper flange 70. The web 65 extends along a length of the elongated structure. The web 65 may comprise a depth D 77 extending between a bottom surface 72 of the top flange 70 and a top surface 47 of the bottom flange 45. The web depth D 77 may be geometrically configured in order to provide a desired resistance to an applied loading to the assembly. In one disclosed arrangement, the depth D 77 of the web 65 comprises a constant depth throughout a length of the elongated structure 20. In an alternative arrangement, the depth D 77 of the web 65 may comprise variable depth along the length of the elongated structure 20. One advantage of such a structure is that the variable web depth D 77 may provide for variable stability where required and may also allow for a lighter weight elongated structure.

Base Flange

In this illustrated arrangement, the base flange 45 and the top flange 70 may comprise generally planar members. For example, a top surface 74 of the top flange 70 is generally planar. Similarly, a bottom surface 90 of the base flange 45 may also be generally planar. However, alternative non-planar surfaces 74, 90 may also be used. In addition, and as will be described in greater detail below, an overall width $W_{BF}$ 60 of the base flange 45 and an overall width $W_{TF}$ 85 of the top flange may comprise a constant width along a span of the elongated structure 20 (i.e., into the page). Alternatively, these widths $W_{BF}$ 60, $W_{TF}$ 85 may vary continuously, or these widths 60, 85 may be constant along at least a one portion of the elongated structure 20. In yet another alternative arrangement, these widths 60, 85 may comprise both of constant width portions along certain lengths of the elongated structure 20 and may also comprise of variable widths along different portions of the same elongated structure.

The base flange 45 of the structural assembly illustrated in FIG. 3 comprises a first base flange portion 50 and a second base flange portion 55. As illustrated, both the first and second base flange portions 50, 55 extend away from a bottom area 68 of the web 65. Both the first and second base flange portions 50, 55 extend laterally on both sides of the web 65. For example, the first base flange portion 50 extends laterally out a distance $W_{FBFP}$ 52 and the second base flange 55 extends a lateral distance of $W_{SBFP}$ 57. As illustrated, both the first and second base flange portions 50, 55 extend laterally along a common plane. However, as those of ordinary skill in the art will recognize, alternative non-planar base flange configurations may also be used. As just one example, an elongated structure may comprise more than two base flange portions.

In this illustrated arrangement, the width $W_{FBFP}$ 52 of the first base flange portion 50 is generally equivalent to the width $W_{SBF}$p 57 of the second base flange portion 55. However, in an alternative configuration, these widths $W_{FBFP}$ 52 and $W_{SBFP}$ 57 may not be equivalent and may be different. As just one example, in one exemplary arrangement, the width $W_{FBFP}$ 52 of the first base flange portion may comprise a variable width along at least a portion of the elongated structure 20 while the width $W_{SBFP}$ 57 of the second base flange portion may remain constant along at least a portion of the elongated structure 20. Similarly, in other exemplary embodiments, both the width $W_{FBFP}$ 52 of the first base flange portion 50 and the width $W_{SBFP}$ 57 of the second base flange portion 55 may comprise a variable width along at least a portion of the elongated structure 20.

In yet further alternative configurations, the elongated structure of the present disclosure may comprise a base flange 45 that comprises only a single base portion, such as a first base flange portion 50 or perhaps only a second base flange portion 55. As just one example, in an elongated structure comprising a base flange portion 45 that comprises only one base flange portion (e.g., such as the first base flange portion 50), such a single base flange portion may comprise a variable width base flange. Further, such a single base flange may comprise a variable width base flange along at least one portion of the elongated structure or perhaps over the entire length of the elongated structure 20.

In addition, and as illustrated, both the first and second base flange portions 50, 55 are generally symmetrical about the web 65 in that they have a similar general geometry. However, such a symmetrical flange configuration is not required, and as discussed herein, other non-symmetrical base flange configurations of elongated structure 20 are within the scope of the present disclosure. As just one example, both the base flange portions may comprise a variable shape extending along a portion of the elongated structure 20. Alternatively, the base flange portions may comprise just one shape along the elongated structure 20. Such a variable shaped flange may include curved, stepped, ramped, or other like flange configurations.

As illustrated, the base flange 45 defines a bottom or outer longitudinal surface 90. This outer longitudinal surface may be configured to abut an upper surface of the skin assembly 30 of the fuselage 10.

Top Flange

The top flange 70 of the elongated structure 20 extends laterally outwards from the web 65. In this illustrated elongated structure 20 of FIG. 3, the overall width $W_{TF}$ 85 of the top flange 70 is relatively narrow compared to a height of the overall elongated structure 20. In addition, in this illustrated elongated structure 20, the width $W_{TF}$ 85 of the top flange 70 is relatively narrow compared to the overall width $W_{BF}$ 60 of the base flange 45. However, as those of skill in the art will recognize, alternative widths $W_{TF}$ 85 of the top flange 70 may be used. For example, the width of the top flange may be a function of the loading experienced by the structural assembly 30 or perhaps the loading experienced by at least one portion of the structural assembly 30, such as the top flange 70 or perhaps only the first or second portion of the top flange 70.

In this illustrated arrangement, similar to the structure of the base flange 45, the top flange 70 comprises two flange portions: a first top flange portion 75 and a second top flange portion 80. Both first and second top flange portions 75, 80 extend away from a top area 71 of the web 65 of the elongated structure 20. Specifically, both the first and second top flange portions 75, 80 extend laterally on both sides of the web 65. For example, the first top flange portion 75 extends out a distance $W_{FTF}$ 76 and the second top flange 80 extends out a lateral distance of $W_{STF}$ 82.

In this arrangement, the width $W_{FTF}$ 76 of the first top flange portion 75 is generally illustrated as being equivalent to the width $W_{STF}$ 82 of the second top flange portion 74. However, in alternative elongated structure configurations, these widths $W_{FTF}$, $W_{STF}$ 76, 82 may not be equivalent and may differ. For example, in one arrangement, the width $W_{FTF}$ 76 of the first top flange portion may comprise a variable width along at least a portion of the length of the elongated structural portion 22 while the width $W_{STF}$ 82 of the second top flange portion may remain constant along the length of the elongated structural, or visa versa. Similarly, in other embodiments, both the width of the first top flange portion $W_{FTF}$ 76 and the width of the second top flange portion $W_{STF}$ 82 may both comprise variable widths along the length of the elongated structure or perhaps just one or more portions of this elongated structure 22.

In yet further alternative elongated structure configurations, the top flange 70 may comprise only a single top flange portion. For example, one exemplary elongated structure may comprise only a first top flange portion 75 while a different exemplary elongated structure may comprise only a second top flange portion 80. Alternatively, an exemplary elongated structure may comprise only a first top flange portion 75 along a first section of the elongated structure and then may comprises only a second top flange portion 80 along a second section of the elongated structure. In such an arrangement, the first section of the elongated structure may reside adjacent the second section of the elongated structure.

Again, where the top flange portion 70 comprises only a single top flange portion, such a top flange portion may comprise a constant or a variable width top flange portion along the length of the elongated structure or perhaps only a portion of the elongated structure. Furthermore, this single top flange portion may comprise a variable width flange along an entire length of the elongated structure 20 or, alternatively, only along at least one portion of the elongated structure 20.

In addition, as illustrated both the first and second top flange portions 75, 80 are generally symmetrical in that they have a similar general geometry. However, such a symmetrical top flange configuration is not required. As discussed herein, other top flange configurations of elongated structure 20 are within the scope of the present disclosure. As just one example, both of the top flange portions may comprise a variable shape and such variable shapes may extend along a portion of the elongated structure 20 or, alternatively, may comprise just one shape along the elongated structure 20. Such a variable shaped flange configurations may include curved, stepped, ramped, or other like flange configurations.

In one preferred arrangement, the elongated structure 20 illustrated in FIGS. 1-3 comprises a monolithic structure. Such a monolithic structure may comprise a composite material. For example, in such a monolithic elongated structure arrangement, the web 65, the base flange 45, and the top flange 70 may be generally formed from a reinforced polymer-based material having multiple layers of reinforcing fibers oriented in a predetermined orientation.

Alternatively, the elongated structure 20 may comprise a metallic elongated structure. Such a metallic structure may be either extruded, rolled, or forged into a desired shape and/or configuration. Alternatively, portions of the elongated structure may be machined so as to achieve a desired geometry and/or configuration. As just one example, a portion of the web of the elongated structure may be machined to have a generally planar surface that may be used as a mounting surface for mounting an elongated structural clip to the elongated structure.

As illustrated in FIG. 3, the structural assembly 20 further comprises a skin assembly 30 having a desired thickness $T_1$. This skin assembly 30 may be coupled to the base flange 45 using, for example, a suitable adhesive material. In general, an elongated structure 20 and the skin assembly 30 may reside in a relatively uncured state, while the other may reside in a relatively cured state. For example, and in one particular embodiment, the skin assembly 30 may be coupled to base flange 45 by interposing a film adhesive material between a relatively uncured skin assembly 30 and the base flange 45 of a relatively cured elongated structure. The film adhesive is then cured while the uncured skin assembly 30 is cured, thereby forming an adhesive bond between the base flange 45 and the skin assembly 30. Alternately, the film adhesive may be interposed between a relatively cured skin assembly 30 and a relatively uncured elongated structure 20, so that the adhesive bond is formed while the elongated structure is cured. The skin assembly 30 may be generally formed from a reinforced polymer-based material having multiple layers of reinforcing fibers oriented in a predetermined orientation.

Still referring to FIG. 3, the skin assembly 30 and the base flange portion 45 may include a least one aperture 44 that projects through the skin assembly 30 and the base flange portion 45. The aperture 44 is suitably sized to accommodate a fastener 40 that threadably engages a nut portion 42 that cooperatively couples the skin assembly 30 and the base flange portion 45. The fastener 40 and the nut portion 42 further cooperatively impart a predetermined compressive force to the skin assembly 30 and the base flange portion 45 when a predetermined torque is imparted to the fastener 42. Such fastening systems develop a predetermined tension by including a shear portion that breaks during installation when the predetermined tension is achieved.

Figure 4:
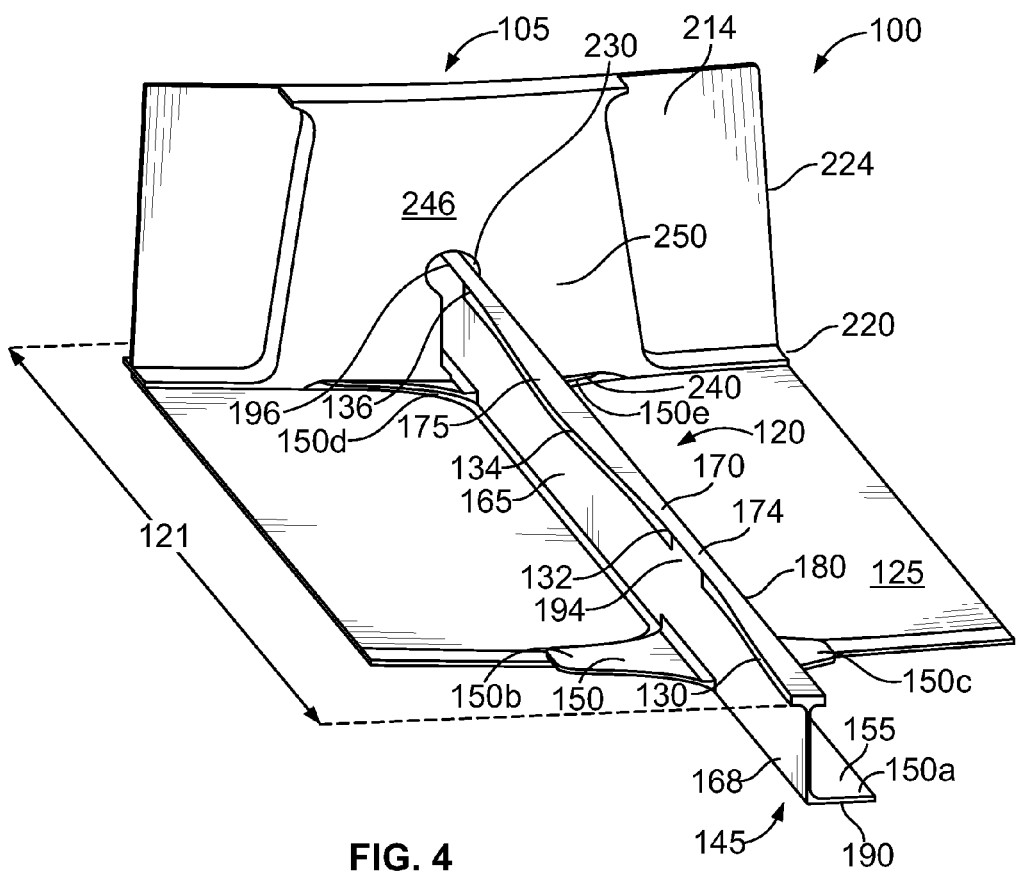
FIG. 4 illustrates a perspective view of an overlapping portion of one of the elongated structures and frame members illustrated in FIGS. 1 and 2.
Figure 5A:
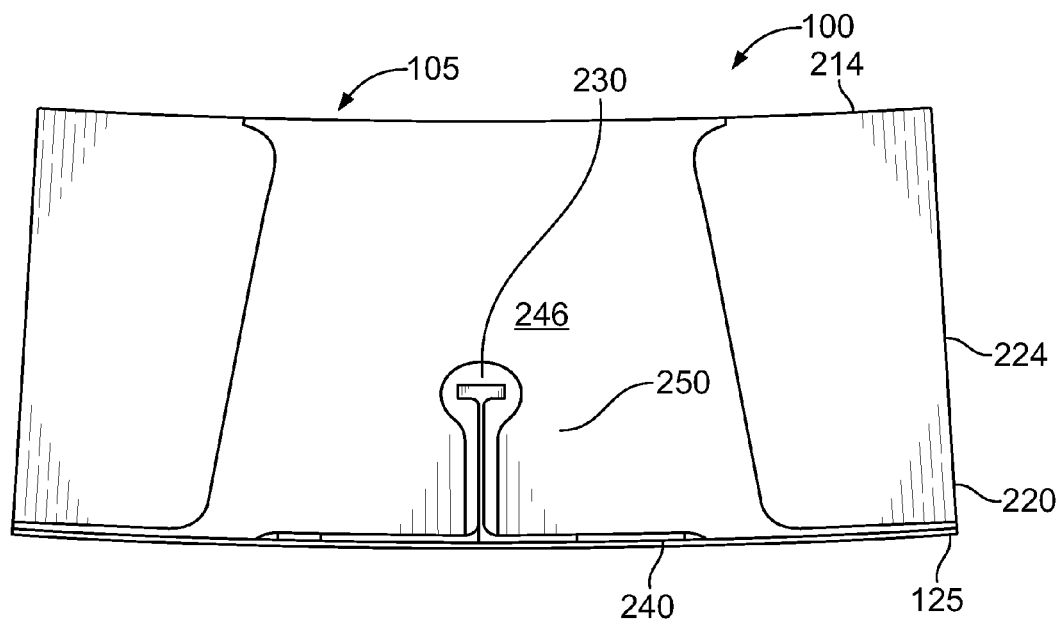
FIG. 5a illustrates a cross sectional view of the elongated structure and frame member illustrated in FIG. 4.
Figure 5B:
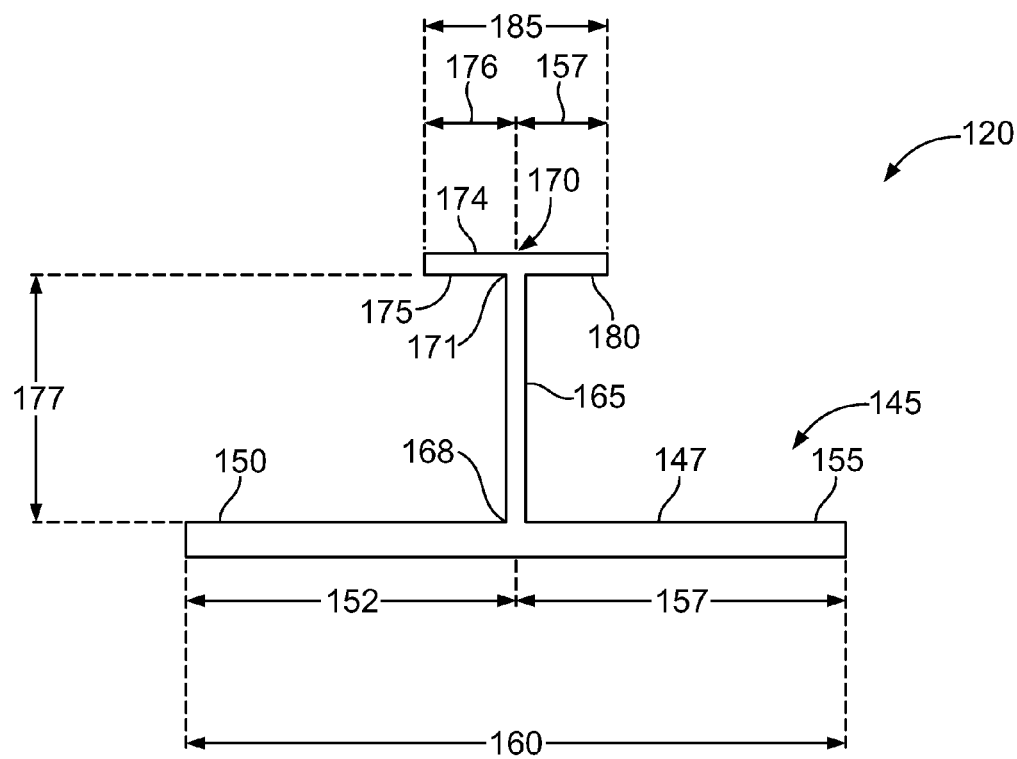

FIG. 4 illustrates one elongated structural assembly 100 according to one aspect of the present disclosure. The elongated structural assembly 100 comprises an elongated structure 120 and a frame member 105. FIG. 5a illustrates a cross sectional view of the elongated structure 120 and frame member 105 illustrated in FIG. 4. FIG. 5b illustrates a close up view of the cross sectional view of the elongated structure 120.

Specifically, FIG. 4 illustrates a perspective view of a structural assembly 100 comprising a skin assembly 125, a frame member 105 and an exemplary elongated structure 120, generally similar to the exemplary elongated structure 20 illustrated in FIG. 3. The structural assembly 100 provides a perspective view of a portion of the fuselage 10 illustrated in FIGS. 1 and 2.

In this illustrated arrangement, the elongated structure assembly 120 comprises a "Z" shaped elongated structure or stringer 120 seated within a frame member 105. However, other beam type or hat type configurations may also be used. Moreover, this elongated structure 120 is mounted on a skin assembly 125 and is provided through an opening or mouse hole 230 in the frame member 105.

Generally similar to the elongated structure illustrated in FIG. 3, the elongated structure 120 of FIGS. 4 and 5 generally comprises a cross-section comprising a top flange and a bottom flange. The top flange comprises a non-uniform or a variable cross-section along at least a portion of the length of the elongated structure. While in this illustrated arrangement, a "Z" shaped elongated structure is provided, the variably cross-sectional elongated structural arrangement would work for other types of elongated structures including but not limited to I-shaped, J-shaped, Z-shaped, T-shaped, and/or hat-shaped elongated structures.

Specifically, this elongated structure 120 comprises a web 165 that is positioned between a base or lower flange 145 and an opposing top or upper flange 170. The web 165 runs a length $W_{ES}$ 121 of the elongated structure 120. The web 165 may comprise a depth $D_W$ 77 extending between a bottom surface 172 of the top flange 170 and a top surface 147 of the bottom flange 145. In this illustrated arrangement, depth $D_W$ 77 comprises a constant web depth. However, in an alternative arrangement, the depth $D_W$ 77 of the elongated structure 120 may comprise a variable depth $D_W$ 77 along at least one section of the length of the elongated structure.

Base Flange

As illustrated in FIGS. 4 and 5, the base flange 145 and the top flange 170 comprise generally planar members. For example, a top surface 174 of the top flange 170 is generally planar. Similarly, a bottom surface 190 of the base flange 145 may also be generally planar, however, alternative non-planar surfaces 174, 190 may also be used. In addition, an overall width $W_{BF}$ 160 of base flange 145 and an overall width $W_{TF}$ 185 of the top flange may comprise a constant width along a length of the elongated structure 120 (i.e., into the page). Alternatively, and as discussed herein, these widths 160, 185 may vary continuously, or these widths 160,

185 may comprise both varying sections and constant sections along at least a one section of the elongated structure 120.

In this exemplary arrangement the base flange 145 comprises a first base flange portion 150 and a second base flange portion 155 with both the first and second base flange portions 150, 155 extending away from a bottom area 168 of the web 165 of the elongated structure 20. Both the first and second base flange portions 150, 155 extend laterally on both sides of the web 165. For example, the first base flange portion 150 extends laterally out a distance $W_{FBF}$ 152 and the second base flange 155 extends out a lateral distance of $W_{SBF}$ 157. As illustrated, both the first and second base flange portions 150, 155 extend laterally along a common plane. However, as discussed with respect to FIG. 3, alternative non-planar base flange configurations may also be used.

In this arrangement, the width $W_{FBF}$ 152 of the first base flange portion 150 is generally equivalent to the width $W_{SBF}$ 157 of the second base flange portion 155. However, in an alternative configuration, these distances $W_{FBF}$ and $W_{SBF}$ may not be equivalent and may differ. As just one example, in one exemplary arrangement, the width $W_{FBF}$ 152 of the first base flange portion may comprise a variable width along at least a portion of the elongated structure 120 while the width $W_{SBF}$ 157 of the second base flange portion remains constant along at least a portion of the elongated structure 120. Similarly, in other exemplary embodiments, both the width $W_{FBF}$ 157 of the first base flange portion 150 and the width $W_{SBF}$ 157 of the second base flange portion 155 may comprise a variable width along at least a portion of the length 121 of the elongated structure 120.

In yet further alternative elongated structure configurations, the base flange 145 may comprises only a single base portion, such as a first base flange portion 150 or perhaps only a second base flange portion 155. As just one example, in an elongated structure comprising a base flange portion 145 that comprises only a first base flange portion (e.g., such as the first base flange portion 150), such a single base flange portion may comprise a variable width base flange. Further, such a single base flange may comprise a variable width base flange along only a portion of the elongated structure or perhaps over the entire length of the elongated structure 120.

In addition, and as illustrated, both the first and second base flange portions 150, 155 are generally symmetrical in that they have a similar general geometry. However, such a symmetrical configuration is not required, and as discussed herein, other base flange configurations of elongated structure 120 are within the scope of the present disclosure. As just one example, both base flange portions may comprise a variable shape extending along a portion of the elongated structure 120 or, alternatively, may comprise just one shape along the elongated structure 120. Such a variable shaped flange may include curved, stepped, ramped, or other like flange configurations.

Top Flange

Referring to FIGS. 4 and 5, the top flange 170 of the elongated structure 120 extends laterally outwards from one side of the web 165, here, it is the top side of the web 165. In this illustrated elongated structure 120, the overall width $W_{TF}$ 185 of the top flange 170 is relatively narrow compared to a height of the overall elongated structure 120. In addition, the width $W_{TF}$ 185 of the top flange 170 is relatively narrow compared to the width $W_{BF}$ 160 of the base flange 145. However, alternative widths $W_{TF}$ 185 of the top flange 170 may also be used and may be a function of the loading experienced by the structural assembly 130 or perhaps the loading experienced by at least one portion of the structural assembly 130.

Similar to the structure of the base flange 145, the top flange 170 comprises two flanges: a first top flange portion 175 and a second top flange portion 180. Both the first and second top flange portions 175, 180 extend away from a top area 171 of the web 165 of the elongated structure 120. For example, the first top flange portion 175 extends out a distance $W_{FTF}$ 177 and the second top flange portion 180 extends out a lateral distance of $W_{SBF}$ 157.

In this arrangement, the width $W_{FTF}$ 177 of the first top flange portion 175 is generally equivalent to the width $W_{STF}$ 182 of the second top flange portion. However, as may be seen from FIG. 4, the width $W_{FTF}$ 177 of the first top flange portion 175 comprises a variable width along at least a portion of the elongated structural portion 122 while the width $W_{SBTF}$ 182 of the second top flange portion remain constant along the elongated structural portion 120.

For example, as may be seen from FIG. 4, the first top flange portion 175 comprises a first section 130, a second section 132, a third section 134, and a fourth section 136. Because the first top flange portion 175 comprises a flange of varying width, the first section 130 is wider than the second section 132, and this second section 134 is generally narrower than the third section 134, and the third section 134 is generally wider than the fourth section 136. In contrast to the first top flange portion, the second top flange portion 180 comprises a constant width along the entire illustrated length 121 of the elongated structure 120. One advantage of providing wider flange sections, such as flange sections 130 and 134, is that these flange sections may be provided between adjacent frame members or rather mid-bay. At this mid-bay location, this is where an increasedstability may be needed along the elongated structure 120. As such, the varying width of the first flange portion 175 may be tailored to support different loads that the elongated structure 120 may experience over the length $W_{ES}$ 121 of the structure.

In an alternative configuration, the top flange 170 may comprise only a single top flange. That is, the top flange 170 may only a first top flange portion 175 or perhaps only a second top flange portion 180. Again, where the top flange portion 170 comprises only one top flange portion, such a top flange portion may comprise a variable width top flange portion (e.g., similar to first top flange portion 175). And again, this single top flange portion may comprise a variable width flange along the length 121 of the elongated structure 120 or, alternatively, only along a section of the elongated structure 120.

In addition, the elongated structure may be provided with one or more clip mounting surfaces. For example, one or more portions of the elongated structure 120 may be machined to have a generally planar surface wherein such surfaces may be used as a mounting surface for mounting an elongated structural clip to the elongated structure. As just one example, one or more portions of the top flange of the elongated structure 120 may be machined to have a generally planar surface wherein such surfaces may be used as a mounting surface for mounting a elongated structural clip to the elongated structure. For example, in FIG. 4, the elongated structure 120 comprises two such generally planar mounting surfaces 194, 196. Preferably, these mounting surfaces are positioned along the elongated structure 120 so as to coincided with the section of the elongated structure that passes through an opening provided by one of the frame members.

Frame Member

The structural assembly illustrated in FIGS. 4 and 5 further comprises the frame member 105 which comprises a wall structure having a top flange 214 and a bottom flange 220 connected by a web 224. The frame member bottom flange 220 extends laterally outwards from both sides of the web 224, while the top flange 214 extends laterally outwards from one side of the web 224. The web of the frame member 210 defines an opening 230 (commonly referred to as a mouse hole) and this opening 230 defines a keyway that generally complementary to a shape of a web and flange configuration of the elongated structure 120. The bottom flange 220 of the frame member 210 further defines a base flange opening 240 and this base flange opening corresponds the base flange of the elongated structure 120. Together, the web opening 230 and the base flange opening 240 allows the elongated structure 120 to extend through (i.e., be spliced by) the frame member 210, preferably, along the skin assembly, preferably along a skin assembly of a fuselage as illustrated in FIGS. 1 and 2.

The frame member web 224 of the frame member 210 comprises an area of increased thickness 246 around the web opening 230 and the web opening 230 is preferably circular to help guard against crack initiation and propagation during loading a load on the fuselage 10 and to help stabilize the top flange 214 of the frame member 210. In this preferred arrangement of the increased thickness 246, this area of the frame member 210 may comprise a flat or planar surface 250. As those of ordinary skill in the art will recognize, the size, shape, material construction, and geometrical shape of the elongated structure 120 and/or frame member 210 can be varied to suit the type of fuselage being assembled, and, therefore, the various components of the structural assembly 200 as depicted herein should not be considered limiting.

Because the elongated structure 120 extends through the frame member 210, contact of a bottom flange 220 of the frame member 210 with the skin assembly 125 occurs at a plurality of circumferentially oriented surfaces defined by the bottom flange 220. In other words, the flange opening 138 interrupts the contact of the bottom surface of the bottom flange 220 with the skin assembly 125 as the bottom flange 220 extends along an inner surface of the skin assembly 125. Overlapping portions are formed between the bottom flanges at an intersection of the elongated structure 120 and frame member 105. This overlapping portion helps to ensure that the elongated structure 120 and frame member 105 help to form a plurality of continuous circumferential outer surfaces that arrest crack propagation.

Elongated Structure Base Flange

Further, the elongated structure 120 comprises a base flange 150 comprising a plurality of base flange portions. In FIG. 4, five base flange portions 150a-e are illustrated. The base flange 150a of FIG. 4 is similar in construction to the second base flange portion illustrated in FIG. 3. The base flange portion 150 of the elongated structure 120 is adjacent to the skin assembly 30, allowing the elongated structure 120 to be in close contact with the skin assembly 30 along the entire fuselage 10.

Figure 6:
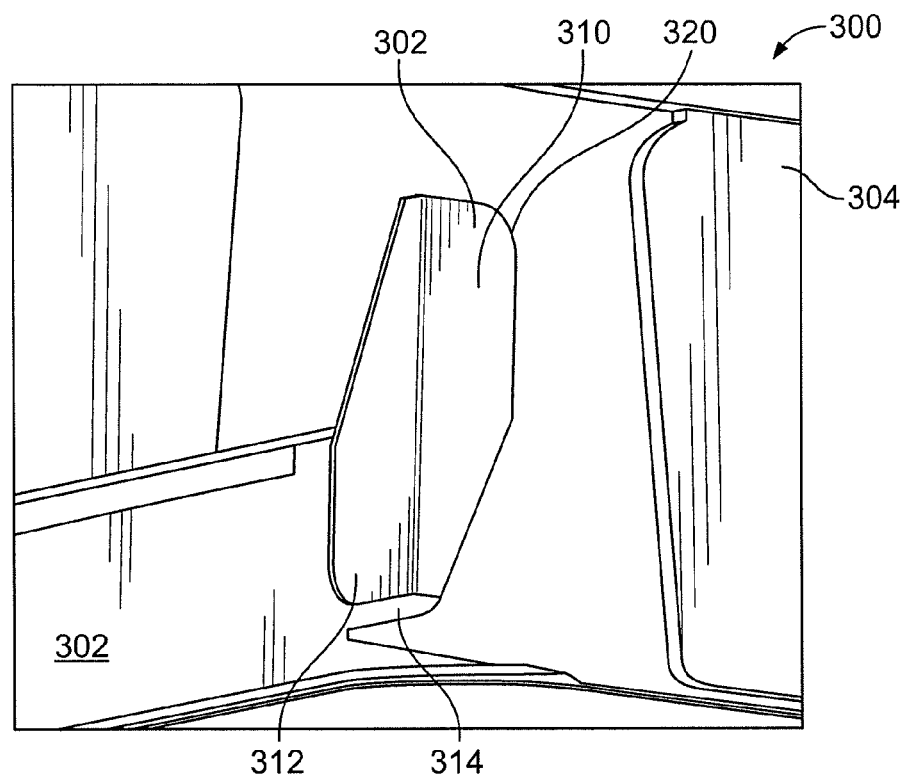
FIG. 6 illustrates a perspective view of one embodiment of an elongated structure mounting clip that can be used with an elongated structure, such as the elongated structure illustrated in FIGS. 4 and 5.
Figure 7:
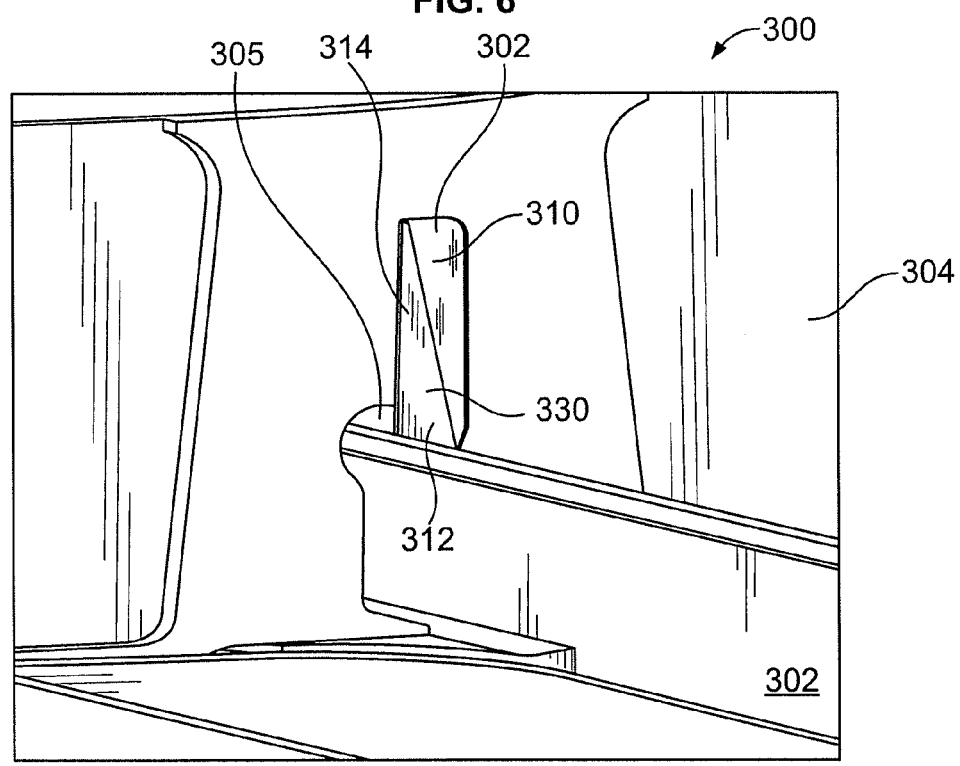
FIG. 7 illustrates another perspective view of the elongated structure mounting clip illustrated in FIG. 6.

FIG. 6 illustrates a perspective view of a structural assembly 300 comprising an alternative elongated structure 302 operably coupled to a frame member 304 by way of a mounting clip 302. FIG. 7 provides an alternative perspective view of the structural assembly 300 with mounting clip 302 illustrated in FIG. 6. Referring now to FIGS. 6 and 7, the elongated structure 302 passes through an opening 305 in the frame member 304, similar to the elongated structure and frame member configuration illustrated in FIGS. 4 and 5. However, this structural assembly 300 further comprises a mounting clip 302. In this illustrated arrangement, the mounting clip 302 comprises a first body portion 310, a second body portion 312, and a main body portion 314. The first and second body portions extend from the main body portion 314, and preferably the first and second body portions reside perpendicular to one another. The first body portion 310 comprises a first mounting surface 320 and the second body portion 312 comprises a first mounting surface 330. In this configuration, the first mounting surface 320 of the first body portion 310 is attached to a planar wall of the frame member 304, near the web opening 305. This flat or planar wall of the frame member 304 is similar to the flat or planar wall surface 250 comprising an increased thickness 246 illustrated in FIG. 4.

Similarly, the first mounting surface 330 of the second body portion 312 is mounted along a flat or planar wall 340 (illustrated in FIG. 6) of the web 302 of the elongated structure 302. Preferably, this mounting clip 302 may be mounted in place by an adhesive, by being bonded, cured, riveted, or using any other similar mounting method.

One advantage of such mounting clips for use with the presently disclosed elongated structures is that such clips can be generally quickly and easily mounted since no special machining of the clip is required since it can be installed along the generally planar or flat surface of a frame member. In addition, such a clip may also be generally quickly and easily installed along a corresponding planar surface of the elongated structure web. Consequently, no additional machining or fabrication of the elongated structure is required. Moreover, since the mounting clip may be installed along the relatively planar surfaces of both the frame member and the elongated structure, the installed clip will remain in place even when the structural assembly is subjected to heightened vibrational and other forces which airplanes frequently encounter. Another advantage of such a clip configuration is that the thickness of the clip can be varied, depending on the overall load that the elongated structure is designed to carry. Such thickness of the clip may be varied without altering the elongated structure and frame member surfaces.

Figure 8:
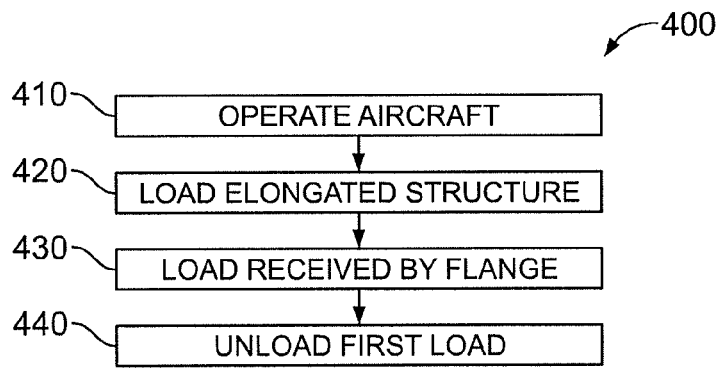
FIG. 8 is an illustration of a block diagram of a method of loading an elongated structure, such as the elongated structure illustrated in FIGS. 1-7.

With reference now to FIG. 8, an illustration of a flowchart of a process 400 for increasing load on an elongated structure is depicted in accordance with an advantageous embodiment. Specifically, FIG. 8 illustrates one arrangement for supporting a structural load in an airplane where the structural load resides on a structural assembly, such as the elongated structural assemblies disclosed herein. Specifically, in one arrangement, the structural load may reside on an elongated structure comprising a web extending along a length of the elongated structure and a flange comprising a first flange portion. In such an arrangement, the load may reside along a first flange portion that extends away from an area of the web. The first flange portion comprises a variable width along at least a portion of the length of the elongated structure. The first flange portion of the elongated structure may comprise a variable width along the length of the elongate structure. The first flange portion of the elongated structure may comprise a constant width along at least a portion of the length of the elongated structure. In one arrangement, the load will reside along a first flange portion that comprises a top flange portion.

As illustrated, the method begins by operating an aircraft at step 410. In particular, the operation of the aircraft applies a pressure and therefore load at step 420 to the elongated structures and frame member attached to this structure. The elongated structure may be a stringer, may be a composite material or may be metallic as discussed herein. The structure may also be coupled to a skin assembly of a fuselage or a wing, such as the skin assembly 125 discussed herein.

In response to the operation of the aircraft, the process generates forces configured to apply the load to certain portions of the elongated member, particularly along a flange portion of the elongated structure at step 430. Such a load may be received in a flange of the elongated structure, the flange comprising a variable width along at least a portion of the elongated structure. Such a flange may comprise a top flange or a bottom flange. The forces may be in a direction generally perpendicular to a top surface of the elongated structure. As just one example, such loading a load may occur along various portions of the elongated structure, particularly where the elongated structure resides in a perpendicular orientation to a second elongated structure (e.g., such as frame member 105) wherein this second elongated structure comprises an opening that is complementary in shape to the first elongated structure. In such a situation, loading a load may occur on a mounting clip that operatively couples a planar surface of the first elongated structure to a planar surface of the second elongated structure.

The method further includes the step 440 of unloading the first load on the elongated structure. This step may comprise a step of unloading the first load along a variable flange provided along at least a portion of an elongated structure. Alternatively, or in addition to, this step may comprise the step of unloading the first load near a mounting clip that operatively couples a planar surface of a first elongated structure to a planar surface of a second elongated structure as discussed herein.

This first load may be unloaded when the vehicle is not airborne. In addition, the first load may vary along a length of the flange. This flange width may vary with load along a length of the flange. As just one example, and referring to FIG. 4, the load may be greater along the first section 130 of the elongated structure 120 than along the second section 132 of the elongated structure. Similarly, the load may be greater along the third section 134 of the elongated structure than along the fourth section 136.

Embodiments Disclosure

Figure 9:
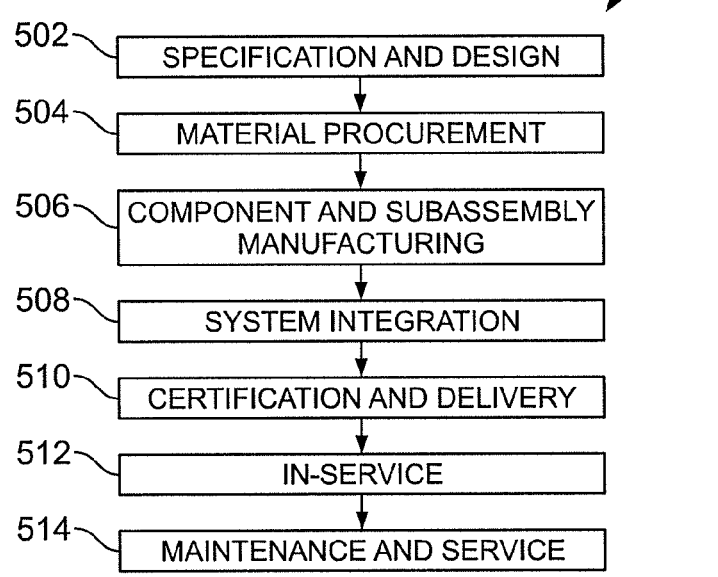
FIG. 9 is an illustration of an aircraft manufacturing and service method in accordance with an preferred arrangement.
Figure 10:
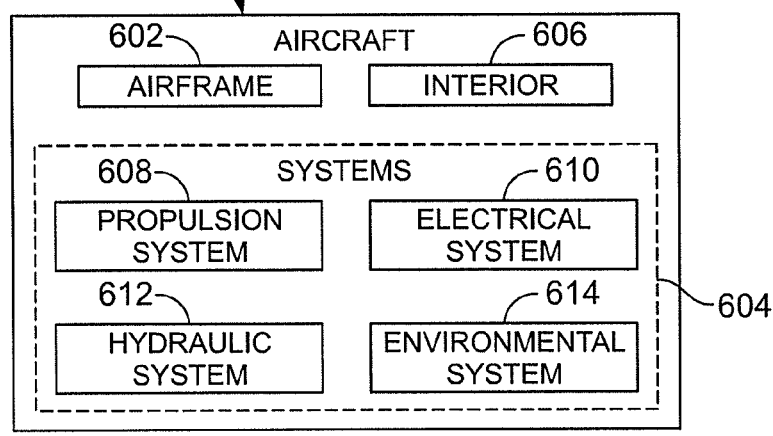
FIG. 10 is an illustration of a block diagram of an aircraft in which an advantageous embodiment may be implemented.

Embodiments of the disclosure may find use in a variety of potential applications, particularly in the transportation industry, including for example, aerospace, marine, automotive applications and other application where elongated structures may be used. Therefore, referring now to FIGS. 9 and 10, embodiments of the disclosure may be used in the context of an aircraft manufacturing and service method 500 as shown in FIG. 9 and an aircraft 600 as shown in FIG. 10. Aircraft applications of the disclosed embodiments may include, for example, without limitation, the design and fabrication of elongated structures such as, without limitation beams, spars and stringers, comprising a varying width flange portion. During pre-production, exemplary method 500 may include specification and design 502 of the aircraft 600 and material procurement 504. During production, component and subassembly manufacturing 506 and system integration 508 of the aircraft 600 takes place. Thereafter, the aircraft may go through certification and delivery 510 in order to be placed in service 512. While in service by a customer, the aircraft 600 is scheduled for routine maintenance and service 514, which may also include modification, reconfiguration, refurbishment, and so on.

Each of the processes of method 500 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 10, the aircraft 600 produced by exemplary method 500 may include an airframe 602 with a plurality of high-level systems 604 and an interior 606. Examples of high-level systems 604 may include one or more of a propulsion system 608, an electrical system 610, a hydraulic system 612, and an environmental system 614. Any number of other systems may be included. Although an aerospace example is shown, the principles of the disclosure may be applied to other industries, such as the marine and automotive industries.

Systems and methods embodied herein may be employed during any one or more of the stages of the production and service method 500. For example, components or subassemblies corresponding to production process may be fabricated or manufactured in a manner similar to components or subassemblies produced while the aircraft 600 is in service. Also, one or more apparatus embodiments, method embodiments, or a combination thereof may be utilized during the production stages 502 and 504, for example, by helping to expedite assembly of or reducing the cost of an aircraft 600. Similarly, one or more of apparatus embodiments, method embodiments, or a combination thereof may be utilized while the aircraft 600 is in service, for example and without limitation, to maintenance and service 514.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

The embodiments of the elongated structures and related assemblies disclosed herein have numerous advantages, some of which are expressly described below. Others may be apparent from the disclosure and discussion provided herein. As just one example, the disclosed elongated structures reduce the overall weight of a elongated structured assembly, such as a fuselage. This weight may be reduced by avoiding the use of heavier materials to facilitate strength to bear concentrated loads or by avoiding the use of additional materials that are not necessary to facilitate strength to bear certain concentrated loads. In addition, the elongated structure may be designed to have greater stability along only certain portions of the elongated structure, such as a mid-bay section of a fuselage. In addition, the elongated structures may be configured so as to provide a more effective load bearing member through an opening in the frame member.

The presently disclosed elongated structures may also reduce the weight of a structured assembly by reducing the need for costly machined attachment fittings by way of the disclosed mounting clip. Moreover, the presently disclosed elongated structures also can be used to reduce costs by way of a reduced "buy to fly" ratio of material purchased to machine attachment fittings. That is, the elongated structures reduce an amount of undesirable labor and/or machining in order to prepare the structure for final installation into the components and subassemblies, such as in airplane components and subassemblies such as fuselages and wings. In addition, the increased load bearing capabilities of such elongated structures may allow for a reduced number of stringers provided for a elongated structure assembly, such as a fuselage or a wing.

Furthermore, the elongated structures can help to reduce costs by reducing the labor costs and machining time of fabricating attachment fittings typically associated with stinger and frame membrane structures. As such, the elongated structures will also help to further reduce the costs of additional cutting tools and related maintenance expenses.

In addition, the elongated structures will help to reduce the total cycle time of component and subassembly structures by reducing the fabrication time necessary to manually modify elongated structures for the attachment fittings. As such, in certain applications, the presently disclosed elongated structures will also help to reduce the amount of time and expense for welding attachment fittings to the elongated structures.

The description of the different advantageous arrangements has been presented for purposes of illustration and description, and is not intended to be exhaustive or limited to the arrangements in the form disclosed. Many modifications and variations will be apparent to those of ordinary skill in the art. Further, different advantageous arrangements may provide different advantages as compared to other advantageous arrangements. The arrangement or arrangements selected are chosen and described in order to best explain the principles of the arrangements, the practical application, and to enable others of ordinary skill in the art to understand the disclosure for various arrangements with various modifications as are suited to the particular use contemplated.

We claim:

1. A structural assembly for a vehicle fuselage, the structural assembly comprising:
    a web extending along a length of an elongated I beam structure, wherein the elongated I beam structure is configured to withstand a structural load that varies over the length of the elongated I beam structure;
    a bottom flange extending away from the web, the bottom flange abutting an upper surface of a skin assembly of the vehicle fuselage, and
    a top flange comprising a first flange portion, the first flange portion extending away from an area of the web, wherein the first flange portion of the top flange comprises a variable width along at least a portion of the length of the elongated I beam structure, wherein the variable width along the at least the portion of the length of the elongated I beam structure varies as a function of the structural load over the at least the portion of the length,
    wherein a portion of the top flange is coplanar with a portion of the length of the web so as to define a generally planar surface used as a mounting surface for mounting an elongated structure clip to the elongated I beam structure, the elongated I beam structure passing through an opening provided by a frame member so as to extend through the frame member,
    wherein the at least the portion of the length of the elongated I beam structure extends from the frame member to an adjacent frame member,
    wherein the width of the first flange portion increase along a first section from the frame member to a mid-bay location, and
    wherein the width of the first flange portion decreases along a second section from the mid-bay location to the adjacent frame member.

2. The structural assembly of claim 1, wherein the first flange portion of the elongated I beam structure comprises the variable width along the length of the elongated I beam structure.

3. The structural assembly of claim 1, wherein the first flange portion of the elongated I beam structure comprises a constant width along at least another portion of the length of the elongated I beam structure.

4. The structural assembly of claim 1, wherein the elongated I beam structure further comprises a second top flange portion.

5. The structural assembly of claim 4, wherein the second top flange portion of the elongated I beam structure comprises the variable width along said at least the portion of the length of the elongated I beam structure.

6. The structural assembly of claim 4, wherein the second top flange portion of the elongated I beam structure comprises a constant width along the at least the portion of the length of the elongated I beam structure.

7. The structural assembly of claim 1, wherein the first flange portion of the elongated I beam structure comprises a rounded portion.

8. The structural assembly of claim 1, wherein the first flange portion of the elongated I beam structure comprises a sharp portion.

9. The structural assembly of claim 1, wherein the first flange portion of the elongated I beam structure comprises a concave portion.

10. The structural assembly of claim 1, wherein the first flange portion of the elongated I beam structure comprises a shape selected from any of the following shapes including convex, rectangular, or ramped shapes.

11. The structural assembly of claim 1 wherein the elongated I beam structure comprises a metallic elongated structure.

12. The structural assembly of claim 1 wherein the elongated I beam structure comprises a composite elongated I beam structure.

13. The structural assembly of claim 1 wherein a width of the web portion of the elongated I beam structure comprises a constant width.

14. The structural assembly of claim 1 wherein a depth of the web of the elongated I beam structure comprises a variable depth.

15. The structural assembly of claim 1 wherein the elongated I beam structure comprises a monolithic structure.

16. The structural assembly of claim 1, wherein the first top flange portion of the elongated I beam structure is operatively coupled to an end of the web.

17. The structural assembly of claim 1, wherein the elongated I beam structure is operatively coupled to the frame member, the frame member comprising a wall structure comprising a first flange and a second flange connected by a web.

18. The elongated I beam structure of claim 17,
    wherein a mounting clip couples the at least one planar surface of the elongated I beam structure to a planar surface of the web of the frame member.

19. The structural assembly of claim 1, wherein the first flange portion comprises a first section, a second section, and a third section having different widths.

20. The structural assembly of claim 1, wherein the width of the first flange portion varies continuously over the at least the portion of the length of the elongated I beam structure.

21. The structural assembly of claim 1, wherein the structural load increases along the first section and the structural load decreases along the second section.

22. A structural assembly for a vehicle fuselage comprising:
- a first elongated I beam structure comprising a web, wherein the first elongated I beam structure is configured to withstand a structural load that varies over the length of the elongated I beam structure;
- a first flange extending along at least a portion of the web, the first flange comprising a variable width, wherein the variable width along the at least the portion of the length of the elongated I beam structure varies as a function of the structural load over the at least the portion of the length, wherein a portion of the first flange is coplanar with a portion of the length of the web of the I beam structure so as to define at least one generally planar surface;
- a second flange extending away from the web, the second flange abutting an upper surface of a skin assembly of the vehicle fuselage,
- a second elongated structure comprising approximately a perpendicular orientation to the first elongated I beam structure, the second elongated structure comprising a wall structure comprising a first flange and a second flange connected by a web, and the second elongated structure further comprising an opening that is complementary in shape to the first elongated I beam structure, wherein the first elongated I beam structure passes through the second elongated structure via the opening, wherein the at least the portion of the length of the elongated I beam structure extends from the second elongated structure to an adjacent third elongated structure, wherein the width of the first flange increases along a first section from the second elongated structure to a mid-bay location, and wherein the width of the first flange decreases along a second section from the mid-bay location to the adjacent third elongated structure.

23. The structural assembly of claim 22, wherein a mounting clip couples the at least one planar surface of the first flange and the portion of the length of the web to a planar surface of the web of the second elongated structure.

24. The structural assembly of claim 22, wherein the first elongated I beam structure further comprises a second top flange portion, and wherein the second top flange portion of the first elongated I beam structure comprises a constant width along the at least the portion of the length of the elongated I beam structure.

\* \* \* \* \*